(No Model.)

T. S. BAYLEY.
TWO WHEELED VEHICLE.

No. 347,022. Patented Aug. 10, 1886.

Witnesses,
Geo. H. Strong.
J. H. Nurse

Inventor,
T. S. Bayley.
By Dewey & Co.
Attys

UNITED STATES PATENT OFFICE.

THOMAS S. BAYLEY, OF ALTURAS, CALIFORNIA.

TWO-WHEELED VEHICLE.

SPECIFICATION forming part of Letters Patent No. 347,022, dated August 10, 1886.

Application filed May 12, 1886. Serial No. 202,000. (No model.)

*To all whom it may concern:*

Be it known that I, THOMAS S. BAYLEY, of Alturas, in the county of Modoc and State of California, have invented an Improvement in Two-Wheeled Vehicles; and I hereby declare that the following is a full, clear, and exact description thereof.

My invention relates to that class of two-wheeled vehicles commonly known as "carts;" and my invention consists, in connection with the axle and shafts, of loops or hangers suspended from and pivoted to the shafts, a frame carried by the loops or hangers, springs clipped to the frame, and a body supported by the springs, all as I shall hereinafter fully describe.

The object of my invention is to give the body such independence of movement as to enable the rider to counteract that unpleasant motion which in ordinary carts is imparted to the body as the result of the jogging motion of the horse.

Figure 1:
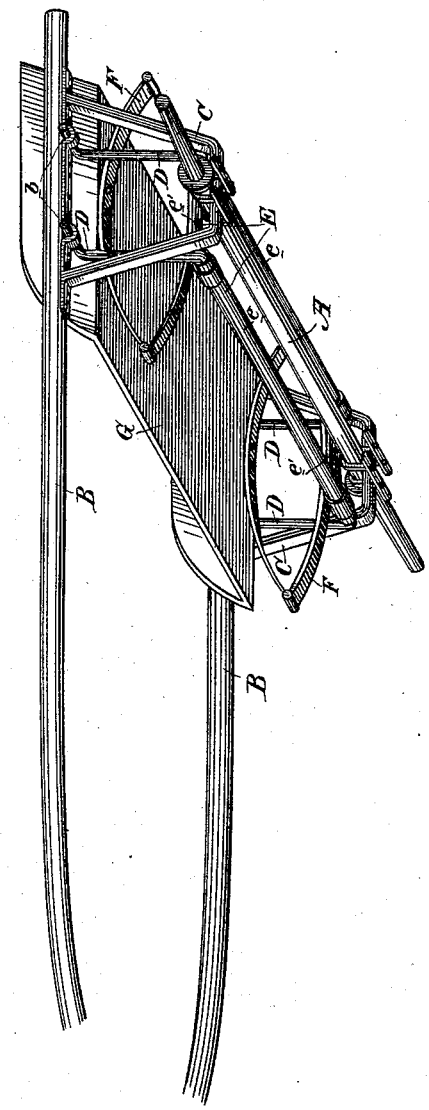
Figure 2:
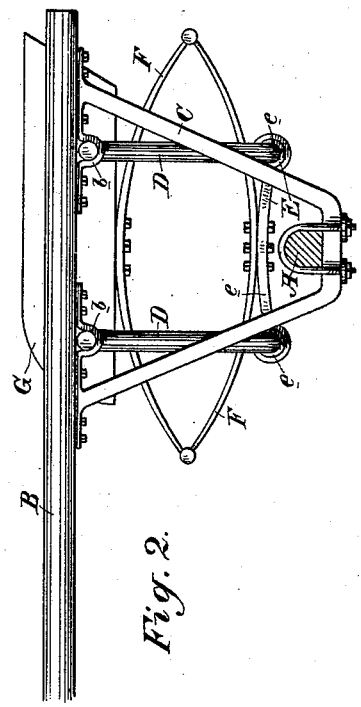

Referring to the accompanying drawings, Figure 1 is a perspective view of my vehicle, looking at it from below. Fig. 2 is a side elevation of same.

A is the axle, and B are the shafts, of my cart. The shafts are rigidly connected with and supported above the axle by the stirrups or brackets C. Pivoted in suitable bearings or journals, *b*, under the shafts, are the loops or hangers D. These consist of bent rods or bars, the ends of which are pivoted in the bearings *b*, and their bodies hang down between the shafts to a plane just above the axle, so that they may swing freely.

E is a frame made up of longitudinal bars *e* and cross-bars *e'*, properly secured together. The hangers carry this frame, and are pivoted therein either by having their ends entering sockets in the longitudinal bars *e*, or, as is preferable, passing through the said bars, which are made tubular for this purpose.

F are elliptic springs clipped solidly to the cross-bars *e'* of the frame E, and G is the body, secured in suitable manner upon the springs.

It will be seen from this construction that the body can have a swinging motion, moving about the center of pivotal action of the loops or hangers. This independence enables the occupant to counteract any movement which the up-and-down motion of the shafts and consequent rocking motion of the axle have a tendency to impart to the body, and, therefore, the unpleasant effect (due to this cause) which is experienced in the ordinary cart is entirely prevented.

It is obvious that the springs might be pivoted directly to the loops or hangers without the intervention of the frame E; but I regard the construction shown as being the most practical, and as giving the necessary strength to the vehicle. This construction of supporting the body and springs on pivoted or swinging loops or hangers may be applied to vehicles other than two-wheeled.

Having thus described my invention, what I claim as new, and desire to secure by Letters Patent, is—

1. In a two-wheeled vehicle, the axle A and the shafts B, supported from and above the axle, in combination with the loops or hangers D, pivoted to the shafts, the springs F, clipped to and carried by the loops or hangers, and the body G, supported upon the springs, substantially as described.

2. In a two-wheeled vehicle, the axle A and the shafts B, secured to and above the axle, in combination with the loops or hangers D, pivoted to the shafts, the frame E, consisting of longitudinal and cross bars, as described, carried by the loops or hangers, and in which said hangers are pivoted, the springs F, carried by the frame, and the body G, supported on the springs, substantially as described.

3. In a two-wheeled vehicle, the axle A, the shafts B, and the stirrups or brackets C, by which the shafts are supported from and above the axle, in combination with the loops or hangers D, pivoted to the shafts, the frame E, consisting of the longitudinal bars *e*, in which the hangers are pivoted, and the cross-bars *e'*, the springs F, clipped to the frame, and the body G, supported by the springs, substantially as described.

In witness whereof I have hereunto set my hand.

THOMAS S. BAYLEY.

Witnesses:
JOHN MADDEN,
JOHN A. METZLER.